United States Patent [19]
Andrade et al.

[11] Patent Number: 5,265,250
[45] Date of Patent: Nov. 23, 1993

[54] APPARATUS AND METHODS FOR PERFORMING AN APPLICATION-DEFINED OPERATION ON DATA AS PART OF A SYSTEM-DEFINED OPERATION ON THE DATA

[75] Inventors: Juan M. Andrade, Chatham; Mark T. Carges, New Providence; Stephen D. Felts, Rockaway, all of N.J.

[73] Assignee: AT&T Bell Laboratories, Murray Hill, N.J.

[21] Appl. No.: 524,182

[22] Filed: Mar. 29, 1990

[51] Int. Cl.⁵ .................................................. G06F 7/00
[52] U.S. Cl. ................................. 395/650; 364/DIG. 1
[58] Field of Search .................. 364/DIG. 1, DIG. 2; 395/650, 200 MS File, 800 MS File

[56] References Cited

U.S. PATENT DOCUMENTS

4,885,684 12/1989 Austin et al. ................. 364/DIG. 1
5,075,847 12/1991 Fromme ....................... 364/DIG. 1

OTHER PUBLICATIONS

Transaction Processing Working Group, *Interim Reference Model for Distributed Transaction Processing*, X/OPEN Company Ltd, Jul., 1989, p. 24.
Andrade, J., Carges, M, Kovach, K. "Building an OLTPS on UNIX System V", CommUNIXations, Nov./Dec. 1989, pp. 14–19.
Manson, C., Thurber, K., "Remote Control", *BYTE*, Jul. 1989, pp. 235–240.
Corbin, J., Silveri, C., "Open Network Programming", *UNIX World*, Dec. 1989, pp. 115–128.
Bloomer, J., "Using RPC", *The Sun Observer*, Feb. 1990, pp. 41–49.
Wiener, R. S., Pinson, L. J., An Introduction to Object-Oriented Programming and C++, Addison-Wesley, 1988, pp. 144–181.
J. C. Mogul, et al., "The Packet Filter: An Efficient Mechanism for User-Level Network Code", Operating Systems Review, vol. 21, No. 5, Nov. 1987, pp. 39–51.
D. Notkin, et al., "Interconnecting Heterogeneous Computer Systems," Communications of the ACM, vol. 31, No. 3, Mar. 1988, pp. 258–273.

*Primary Examiner*—Thomas Heckler
*Attorney, Agent, or Firm*—Gordon E. Nelson

[57] ABSTRACT

Apparatus and method for performing an application-defined operation on data as part of a system-defined operation on the data. The apparatus and method are embodied in a distributed transaction processing system in which processes running on component systems which may be heterogeneous interact according to the client-server model. In the apparatus and method, a type is associated with the data and application-defined operations which are part of certain system-defined operations are defined for each type. The system-defined operations which the application-defined operations are part of include allocation, reallocation, and deallocation of buffers and sending buffers between clients and servers using remote procedure calls. In the allocation and reallocation operations, the application-defined operation is initialization; in the deallocation operation, it is uninitialization. In buffer sending, the application-defined operations include operations done on the buffer contents before sending, routing, encoding the buffer contents into a transfer syntax, operations done on the buffer contents after sending, decoding the buffer contents from the transfer syntax after receiving, and operations done on the buffer contents after receiving. Data structures in the processes associate the data and its type and a type and its application-defined operations. Servers employ a shared bulletin board data structure to indicate the types they accept.

29 Claims, 8 Drawing Sheets

APPARATUS AND METHODS FOR PERFORMING AN APPLICATION-DEFINED OPERATION ON DATA AS PART OF A SYSTEM-DEFINED OPERATION ON THE DATA

TECHNICAL FIELD

The invention is related to data processing systems generally and to hierarchically-organized data processing systems in particular.

BACKGROUND OF THE INVENTION

1. Field of the Invention

The invention is employed in data processing systems which have a hierarchy of levels. Programs executing at one level employ functions provided by the next level down, and can thus use the resources of the lower level without knowledge of the implementation details of that level.

2. Description of the Prior Art

Data processing systems are often organized as a hierarchy of levels. At the lowest level, there is the physical hardware which performs the actual operations of moving and manipulating data; at a higher level is an operating system. The operating system controls the actual operation of the physical hardware and makes the resources of the hardware available to users of the operating system. In so doing, the operating system effectively defines a set of logical operations for higher levels in the hierarchy. Programs using this set of logical operations can run on any hardware which the operating system will run on. The data processing system may additionally include levels above the operating system which define logical operations for still higher levels. Examples of such levels include data base systems, transaction processing systems, and so on. Seen from the point of view of a given level, lower levels are system levels, because they define the set of logical operations used by programs running at the given level. Similarly, the operations provided by lower levels are system operations. The reverse is also true: seen from the point of view of a given level, higher levels are application levels, because they use the system functions defined by the lower level, and programs running at the application levels are application programs.

A great advantage of such hierarchical systems is that a given level hides the details of the operations it performs from higher levels. For example, the operating system defines a set of logical file operations; higher levels can use these logical file operations with no knowledge whatever of the manner in which the operating system actually performs the file operations on physical devices such as disk drives or terminals. As data processing systems and programs grow in complexity, hiding becomes more and more important: not only does it make it possible for programmers working at each level to master the complexity of the system, it also makes it possible to modify a lower level of the system without changing the higher levels.

A difficulty with hiding is that it works both ways: it not only hides the details of lower-level operations from higher levels, but also hides the details of higher-level data structures from the lower-level operations. For example, an application program may wish to construct a tree data structure in memory; to do that, it uses a system allocate function, which typically takes two arguments: a pointer to the allocated memory and a specification of the size of the allocated memory. Since these are the only arguments, the allocate function necessarily has as little notion of the tree data structure which it is being used to construct as the application program has of the memory system in which the space is being allocated. In consequence, the application program cannot simply use the system allocate function to allocate the tree data structure; instead, it must use the system allocate function to allocate raw memory space and then use an initialization routine running at the application level to make the space provided by the allocate function into the tree.

An area in which the hiding of higher-level data structures from lower-level operations causes particular difficulty is in distributed systems. In a distributed system, the data is processed by a set of component systems connected by a network. The component systems may have different hardware and/or operating systems and may send and receive data using different transfer syntaxes. When data is sent from a source component system to a destination component system in such a distributed system, it is often necessary to put the data in a form which permits the data to be distributed across the network, convert the data into the format required for the destination component's hardware or operating system, and put the converted data into the transfer syntax required for the destination machine. From the point of view of the application program, the send and receive operations are clearly system operations; on the other hand, the operations of putting the data in a form which permits distribution across the network, converting the data into the formats required by the destination machine, and putting the converted data into the proper transfer syntax all require a knowledge of the data which is available only at the application program level.

One way in which the prior art has attempted to deal with the fact that the form of the data being sent or received is hidden from the system-level send and receive operations is shown in the Open Network Computing system developed by Sun Microsystems. As presented in John Corbin and Chris Silvieri, "Open Network Programming", *Unix World*, December 1989, pp. 115-128, the Open Network Computing system uses remote procedure calls to send data to and receive data from other components of a distributed system. Data being sent is converted into a transfer syntax called External Data Representation (XDR). The Open Network Computing System provides library routines for converting integers, Booleans, enumerations, floating point values, bytes, arrays, character strings, structures, and unions to and from XDR; the user can use these library routines to write conversion procedures. Addresses of these conversion procedures are then used as arguments in the remote procedure calls.

While the Open Network Computing system does overcome the consequences of hiding the form of the data being sent or received from the system send and receive operations, it does so at a cost: first, the conversion to and from XDR is no longer hidden from the application program, but must be specified in every remote procedure call; second, only conversion to and from XDR are possible in the system; third, the conversion must be described within the framework of primitive and complex data types provided by XDR. What is lacking is apparatus and methods which permit both hiding of the details of the system operations and definition by the application program of portions of system operations which are affected by the application program's data, which do not restrict the application programmer to a single transfer syntax, and which do not require the application programmer to describe conversions using a built-in type framework. It is an object of the present invention to provide such apparatus and methods.

SUMMARY OF THE INVENTION

The inventions is apparatus for performing an application-defined operation on data as part of a system defined operation on the data. The apparatus includes first system defined means for associating an application-defined type with the data, second system-defined means for associating the application-defined operation with the type, and third system-defined means employed by the system-defined operation and responsive to the type for causing the application-defined operation to be performed on the data as part of the system-defined operation.

Species of the invention include a first species which is buffer handling apparatus. The buffer handling apparatus includes first system-defined means for associating an application-defined type with the buffer, second system-defined means for associating an application-defined operation with the type, and third system-defined means for performing a system-defined operation on the buffer without reference to the buffer type, the third system-defined means employing the second system-defined means to perform the application-defined operation and the second system-defined means responding to the type by causing the application-defined operation to be performed.

A second species is apparatus usable with any data passing means for passing data between a first application being executed in a first environment and a second program being executed in a second environment which may be heterogeneous to the first environment with regard to the data being passed. In the first environment, the apparatus includes system-defined type association means which associates an application-defined type with the data, first system-defined operation association means which associates the type with a first application-defined operation which is performed on the data when the data is passed to the second environment, and first system-defined data passing means which employs the first system-defined operation association means to perform the application-defined operation, the first system-defined operation association means responding to the type by causing the first application-defined operation to be performed. In the second environment, the apparatus includes second system-defined operation association means which associates the type with a second application-defined operation which is performed on the data when the data is received from the first environment, and second system-defined data passing means which employs the second system-defined operation association means to perform the second application-defined operation.

It is thus an object of the invention to provide an improved data processing system;

It is a further object of the invention to overcome present shortcomings of hierarchical systems in hiding lower levels of the hierarchy;

It is another object of the invention to provide improved buffer handling apparatus; and It is an additional object of the invention to provide improved apparatus for passing data between application programs.

These and other objects and advantages of the invention will become apparent to one of ordinary skill in the art upon consideration of the following Detailed Description and the drawing, wherein:

Figure 1:
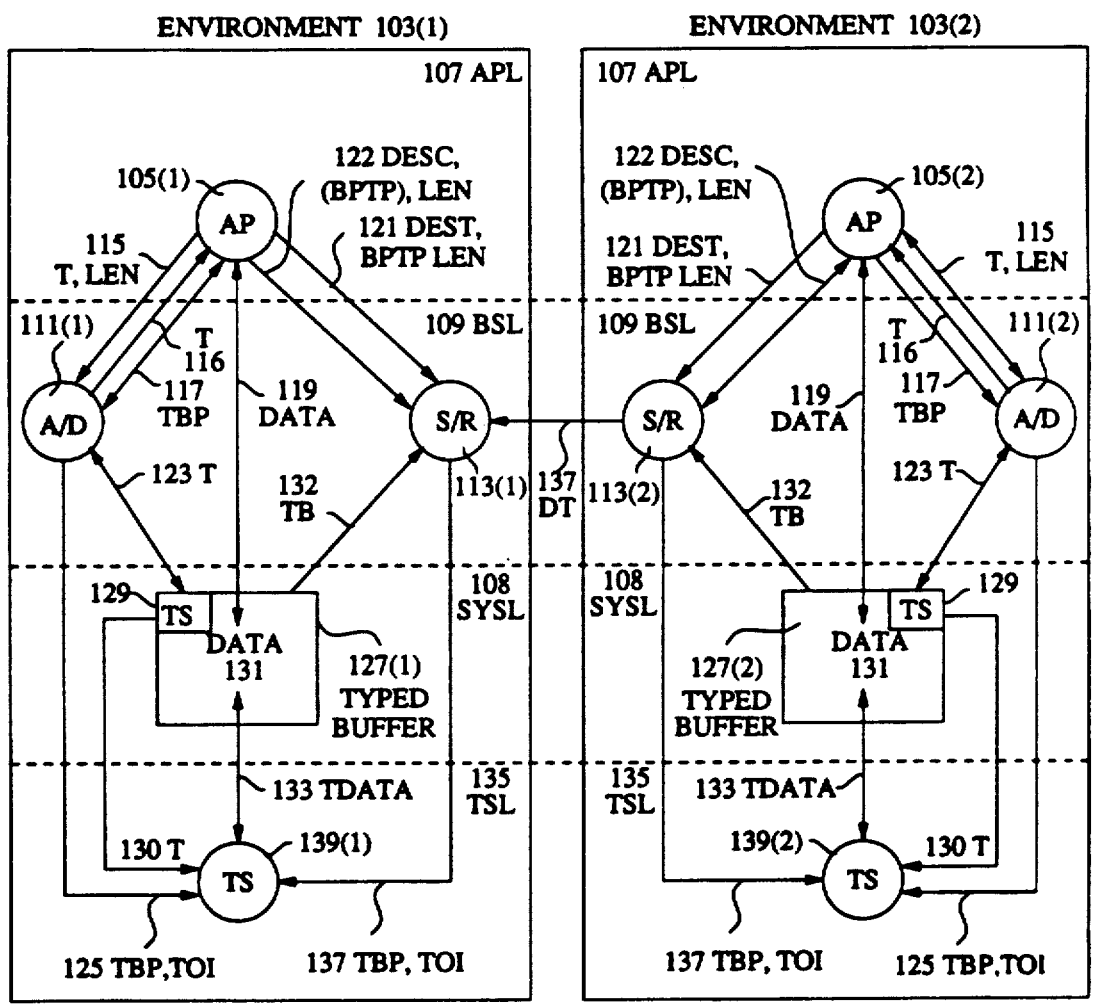
FIG. 1 is an overview of the invention as used to pass data between application programs in heterogeneous environments.

The reference numbers in the Figures have two parts: the two least significant digits indicate a reference number in a figure; the remaining digit indicates the drawing in which the item specified by the reference number is first shown. Thus, type switch 503 is first shown as item 503 in FIG. 5.

DETAILED DESCRIPTION

The following Detailed Description of the invention will first provide an overview of the invention and then describe a presently-preferred embodiment of the invention in a distributed transaction processing system which employs the clientserver model.

OVERVIEW OF THE INVENTION: FIG. 1

One area in which the invention is useful is communicating data between programs which are being executed in environments which are heterogeneous with regard to the data. Examples of programs operating in such environments include the following:

The programs are operating on hardware which requires different representations for certain kinds of data. An example of data whose representation differs by hardware is floating point data.

The programs are operating on operating systems which require different representations for certain kinds of data. An example here is system identifiers.

The programs are operating on systems which expect different communications protocols; and The programs are operating in a distributed system in which different kinds of data are processed at different nodes in the system.

FIG. 1 shows apparatus 101 embodying the invention which permits communication between programs being executed in such heterogeneous environments. Two environments, 103(1) and 103(2), which may differ in any of the ways indicated above or other ways, are coupled together by a data transport 137, which is any arrangement permitting data to be communicated between the environments. Examples of data transports 137 include at least the following:

data structures such as stacks and queues accessible to both of the programs being executed;

files accessible to both of the programs;

remote procedure calls;
Interprocess communication arrangements such as UNIX ® pipes;
other message systems.

Of course, arrangements such as remote procedure calls, interprocess communications, and the other message systems may be implemented using standard or private data transport protocols.

Each environment 103 has levels at which various functions are available. The top level is application program level 107. Programs at that level embody specific applications running in the system of environment 103. An example of such an application might be a text editor or a billing application. Programmers writing programs at that level have available to them functions provided by the system of environment 103. In FIG. 1, such system functions appear in system level 108. Examples of such functions include functions for allocating and deallocating regions of memory and functions for sending and receiving messages.

In the apparatus of FIG. 101, the functions in system level 108 include functions which make it possible for application programs to specify and use typed buffers. An application program which uses such typed buffers appears in environment 103 as AP 105(1). One of the typed buffers appears as typed buffer 127(1). Like ordinary buffers, typed buffer 127(1) contains data 131 which may be manipulated by application program 105(1). Additionally, it contains a type specifier 129 which indicates the type of typed buffer 127(1). As will be explained in more detail later, the type of a typed buffer determines how certain system functions involving the typed buffer in environment 103(1) and 103(2) will be carried out at system level 108.

There are two levels of typed buffer functions in apparatus 101. The first level, buffer services level 109, associates a type with a typed buffer 127 and provides services to application program 105(1) which are independent of the typed buffer's type and which deal with the buffer as a whole, rather than with its contents. In a preferred embodiment, the services include allocation, reallocation, and deallocation of the typed buffers 127, indicating the type of a typed buffer 127, and sending typed buffers 127 to and receiving typed buffers 127 from other environments 103. The programs performing allocation and deallocation appear as A/D 111(1) in environment 103(1) and those which send and receive the typed buffers appear as S/R 113(1) in that environment.

The second level, type services level 135, provides services to programs in buffer services level 109 which are dependent on the type of typed buffer 127 The programs providing the type services appear in environment 103(1) as type services (TS) 139(1). The services provided in a presently-preferred embodiment include the following:

On allocation or reallocation: initialization of the typed buffer;
On deallocation: uninitialization of the typed buffer;
On sending/receiving:
  processing the buffer's contents before and after sending;
  encoding the contents into a transmission format before sending;
  selecting a route for the buffer;
  decoding the contents from a transmission format after receiving; and
  processing the buffer's contents after receiving it.

Other such type-dependent services are of course possible. An important feature of the design of apparatus 101 is that the functions of type service level 135 are available only to buffer service level 109, and not to application program level 107. The processing required for a given type of typed buffer 127 is thereby hidden from application program 105.

The interaction of the components of environment 103(1) is shown by arrows showing the flow of information between the levels and the components within the levels. Beginning with application program 105(1), that program can employ routines in allocate/deallocate 111(1) to allocate, deallocate, reallocate, and determine the type of a typed buffer 127. To allocate a buffer, application program 105 specifies the buffer's type and length, as indicated by arrow 115; allocate/deallocate 111 allocates the typed buffer 127, sets type specifier 129 to a value corresponding to the type specified by application program 105, and returns a typed buffer pointer (TBP) pointing to typed buffer 127 to application program 105, as shown by arrow 117. To reallocate a typed buffer 127, application program 105 provides the typed buffer 127's TBP and the reallocated typed buffer 127's length to allocate/deallocate 111. To determine the type of a typed buffer 127, application program 105 provides the typed buffer 127's TBP to allocate/deallocate 111 and receives the type of the typed buffer 127 in return, as shown by arrow 116. To deallocate a typed buffer 127, finally, application program 105 simply provides typed buffer 127's pointer 117 to allocate/deallocate 111, which thereupon deallocates the buffer.

Once typed buffer 127 has been allocated, application program 105 can write data 131 to the buffer and read data 131 from the buffer, as indicated by arrow 119. Application program 105 can further send buffer 127 to another program by means of routines in send/receive 113(1). In a preferred embodiment, the interface between application program 105 and send/receive 113 resembles that for remote procedure calls. A typed buffer 127 is sent to an application program 105(2) in environment 103(2) by specifying the application program 105(2), a typed buffer pointer 117 to typed buffer 127, and the length of typed buffer 127, as shown by arrow 121. There are two types of send routines: one is synchronous: when the send routine is invoked, application program 105(1) suspends execution until application program 105(2) returns the call. In this version of the send routine, application program 105(1) additionally specifies a typed buffer 127 to receive the reply. The other send routine is asynchronous: application program 105(1) specifies typed buffer 127 to be sent and the receiving application program 105(2) to the asynchronous send routine and immediately receives a descriptor from the asynchronous send routine. Execution of application program 105(1) is not suspended after typed buffer 127 is sent. Instead, application program 105(1) employs another routine in send/receive 113(1) to get the returned typed buffer 127. This "get reply" routine has options which permit application program 105(1) to get any returned typed buffer or to get a typed buffer matching a descriptor from the asynchronous send routine and to either suspend execution until a typed buffer 127 has been retrieved or to continue execution even though no typed buffer 127 has been received. When "get reply" has found a typed buffer, one of the routine's arguments contains a pointer to the typed buffer 127. As shown by arrow 130, the send- /receive routines just described take the data they send from the typed buffer 127 specified by the pointer and place the data they receive into a typed buffer 127 and return a pointer to the typed buffer 127 containing the received data. The sent data includes type specifier 129.

As indicated above, routines at buffer services level 109 use routines in type services 139 to do type-related processing of typed buffer 127 from the time it is allocated until the time it is deallocated. Interfaces between buffer services level 109 and type services level 135 are the typed buffer pointer 117 for typed buffer 127 to be processed and information required for the processing, as shown by arrows 125 and 137, where TOI indicates the other information. Type services 139 uses the buffer pointer to locate type buffer 127, then reads type specifier 129 to determine typed buffer 127's type, and then does the specified processing as required for the type. As will be explained in more detail below, the type services include services provided with environment 103 and services defined by the application programmer and incorporated into type services 139.

OPERATION OF APPARATUS 101

Operation of apparatus 101 will be explained using an example in which typed buffer 127(1) has the type B-tree, indicating that data 131 is a B-tree data structure with leaf nodes containing ASCII character strings as required by environment 103(1) and data in typed buffer 127(2) is the same B-tree data structure with leaf nodes containing EBCDIC character strings as required by environment 103(2). It is further assumed that data transport 137 uses a standard data transmission format.

The type of typed buffer 127 first comes into play when application program 105(1) allocates typed buffer 127. Application program 105(1) specifies the B-tree type, so after allocating memory for typed buffer 127, allocate/deallocate 111(1) calls type services 139(1), which executes a B-tree initialization routine. The routine constructs the index structures necessary for the B-tree in data 131. Application program 105(1) then builds the B-tree in data 131 until it reaches the point where it is necessary to send the B-tree to application program 105(2) for further processing in environment 103(2).

To send the B-tree, application program 105(1) employs one of the routines of send/receive 113(1) which were described above. That routine in turn employs type services 139(1) to do the processing required for the B-tree type before typed buffer 127 of that type can be sent. The processing includes the following:

Converting the B-tree to a flat data structure from which the B-tree can be reconstituted; and Encoding the contents of the buffer which have resulted from the first conversion into the transmission format.

When type services 139(1) have completed the processing required for the type and the transmission format, send/receive 113(1) sends typed buffer 127 to application program 105(2).

Thus sent, typed buffer 127 goes via data transport 137 to send/receive 113(2), which employs type services 139(2) to do the processing required for the B-tree type after a typed buffer 127 of that type has been received in environment 103(2). The processing done by type services 139(2) includes the following:

Decoding the contents of the buffer from the transmission format into the flat data structure;

Reconstituting the B-tree index structure from the flat data structure; and

Converting the ASCII character strings in the leaf nodes to the corresponding EBCDIC character strings. This step may require rearranging the B-tree to take differences between the ASCII and EBCDIC collating sequences into account.

After type services 139(2) has finished and send/receive 113(2) has made typed buffer 127(2) available to application program 105(2), application program 105(2) manipulates typed buffer 127(2). In the course of the manipulation, application program 105(2) may have to increase or decrease the size of typed buffer 127; to do so, it reallocates typed buffer 127, using a reallocation routine in allocate/deallocate 111(2) to do it; as described above for allocate/deallocate 111(1), the reallocation routine in allocate/deallocate 111(2) in turn employs a reinitialization routine for the B-tree type in type services 139(2) to construct the indexes required for the resized typed buffer 127 and its contents. After further processing, application program 105(2) may return typed buffer 127 to application program 105(1); when application program 105(2) does so, send/receive 113(2) and send/receive 113(1) employ type services 139(2) and 139(1) to do the necessary pre-send and post-send processing in the same fashion as just described. Finally, if either application program 105(1) or 105(2) deallocates typed buffer 127, allocate/deallocate 111 employs type services 139 to do the uninitialization required for typed buffers 127 having the B-tree type.

DESCRIPTION OF A PREFERRED EMBODIMENT

The following description of a presently-preferred embodiment of apparatus 101 will first give an overview of the system in which the preferred embodiment is implemented, will then give an overview of the implementation of the preferred embodiment in the system, and will finally provide details of certain aspects of the preferred embodiment.

Figure 2:
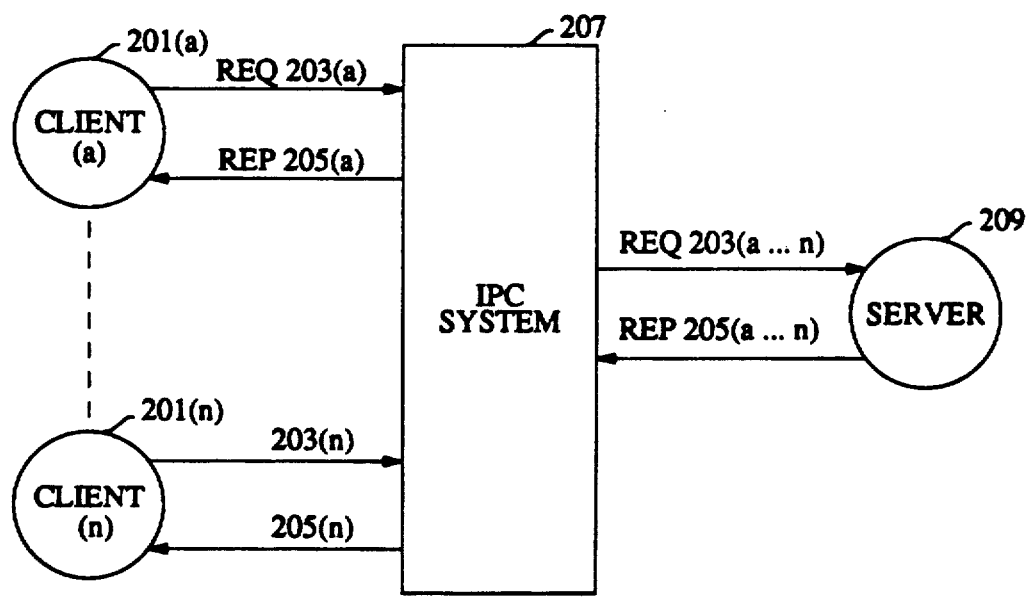
FIG. 2 is a block diagram of clients and a server.
Figure 3:
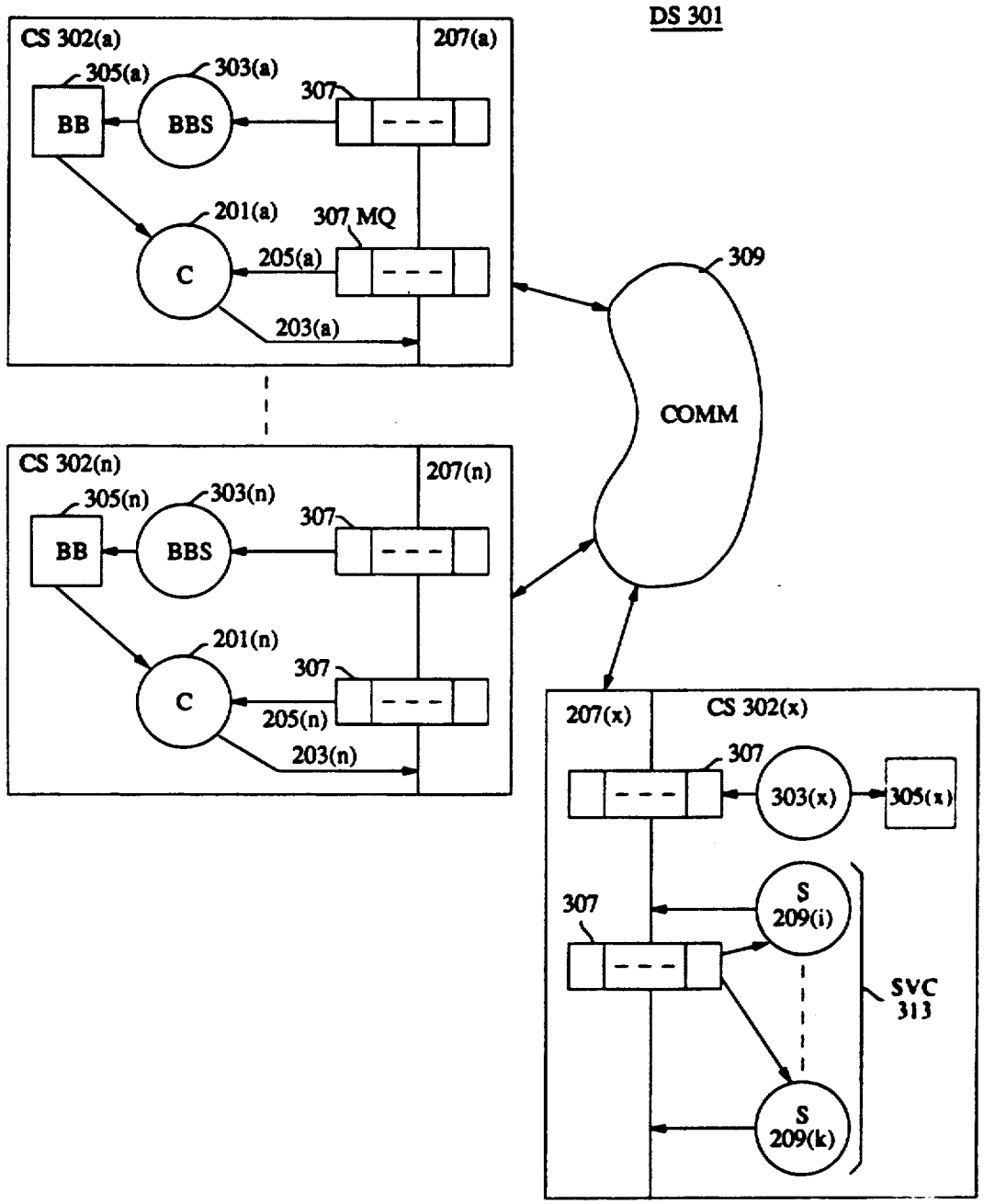
FIG. 3 is a block diagram of a distributed system in which the invention is implemented.

OVERVIEW OF THE SYSTEM IN WHICH A PREFERRED EMBODIMENT IS IMPLEMENTED: FIGS. 2 AND 3

A preferred embodiment of apparatus 101 is implemented in Release 4.0, distributed Mar. 30, 1990, of the AT&T TUXEDO ® transaction processing system. The TUXEDO ® system is made by AT&T and operates in a distributed environment under the UNIX ® operating system. The only aspects of the TUXEDO ® system which are important to the present discussion are the fact that the system is structured according to the well-known client-server model and the arrangements which permit use of the client-server model in a distributed system.

The client-server model is shown in FIG. 2. In the model, a system is designed as a set of processes. In their relationships to each other, the processes making up the system are clients or servers. Servers are processes which provide services to other processes; clients are processes which request services from servers; as is clear from the foregoing, a given process may be exclusively a client, exclusively a server, or more frequently, a client with regard to some processes and a server with regard to other processes. A simple example of a server process is a process which controls a printer; a simple example of a client process is a process which requests the server process to print a document.

The system shown in FIG. 2 has a number of client processes 201(a . . . n) and a single server process 209. All processes in the system communicate by means of interprocess communication system 207, which permits the processes to send messages to one another. In the client-server model, a client 201 makes a request 203 of a server 209 by sending a request message identifying a function provided by server 209 via IPC 207; on receiving request 203, server 209 performs the requested function and makes a reply 205 by sending a reply message via IPC 207. The client-server model of FIG. 2 may further be employed to implement the send and "get reply" routines described above; in such a system, the send routines make requests 203 and the "get reply" routine receives replies 205. As indicated above, the send may be synchronous or asynchronous.

FIG. 3 shows how the client-server model of FIG. 2 is implemented in the TUXEDO ® system. Distributed system 301 consists of a number of component systems 302 connected by a communications system 309. Interprocess communication system 207 in each component system 302 can communicate with processes in each component system 302 and with processes in other component systems 302 by means of communications system 309. Each process has at least one message queue 307; when interprocess communication system 207 receives a message for a process, it places the message in the process's message queue 307. If the receiving process was suspended until arrival of the message, the arrival causes the process to resume execution. The receiving process may further use "get reply" as described above to periodically poll message queue 307 to determine whether it has any messages.

The TUXEDO ® distributed transaction processing system is designed to continue operating as component systems 302 are added to or taken out of the distributed system and as the system is reconfigured by moving servers 209 and clients 201 from one component system to another, by adding functions to or removing them from existing servers, or by adding new servers with new functions. To ensure that processes in the system can determine what functions are presently available and where they are located in system 301, system 301 employs a bulletin board system. The system consists of a bulletin board (BB) data structure 305 and a bulletin board server 303 in each component system. Bulletin board 305 lists all of the functions which servers 209 make available to processes in the component system 302 to which bulletin board 305 belongs may communicate. One portion of bulletin board 305 lists global functions, i.e., functions which are available to clients 201 on every component system 302. Bulletin board 305 is maintained by bulletin board server 303. When a process which has no global functions is created or destroyed, bulletin board server 303 updates the list of functions in the non-global part of bulletin board 305 in the component system 302 to which bulletin board server 303 belongs; when a process which executes global functions is created or destroyed, bulletin board server 303 updates the global part of bulletin board 305 accordingly and further sends interprocess communications to the bulletin board servers 303 in the other component systems 302 indicating that the global parts of their bulletin boards 305 are to be updated in the same fashion. By this means, the global portions of bulletin boards 305 in each component system 302 are kept consistent with each other.

A further characteristic of the TUXEDO ® system is the organization of one or more servers 209 into a service. A service is a set of servers 209 which perform the same set of functions. In FIG. 3, the set of servers 209(i . . . k) in CS 302(x) make up a service 313. One example of such a service might be a data base which is divided among several servers in such fashion that each server handles requests to read information from or write information to one portion of the data base. Another example might be a service such as printing in which several servers were used to balance the load among a set of printers. In the TUXEDO ® system, each service 313 has only a single message queue 307 for receiving requests for that service 313. Which server 209 belonging to the service handles a given request is managed by the service 313.

THE PREFERRED EMBODIMENT IN A COMPONENT SYSTEM 302: FIG. 5

Figure 5:
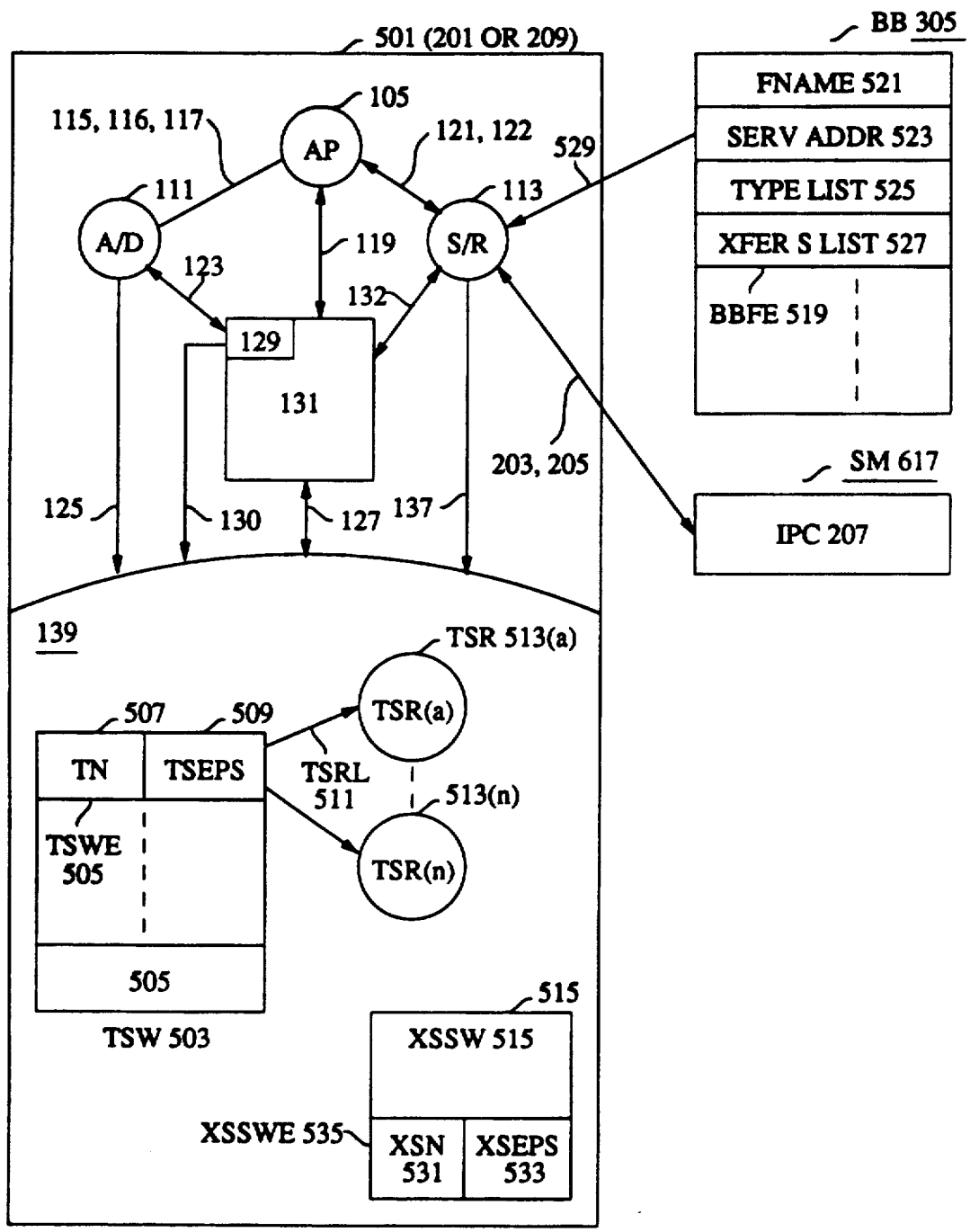
FIG. 5 is a diagram of the invention as implemented in a process of the distributed system.

FIG. 5 shows how apparatus 101 is implemented in a process 501 which is executing routines in a component system 302 of distributed system 301. Within process 501, routines executed by process 501 are represented by circles and per-process data used by the routines are represented by boxes. To show the relationship between FIG. 1 and FIG. 5, components of FIG. 5 corresponding to those of FIG. 1 have the reference numbers employed in FIG. 1. Thus, the routines executed by process 501 included application program 105, allocate/deallocate routines 111, and send/receive routines 113. Type service routines 139 have been expanded to show details of the internal structure of that portion of apparatus 101.

The connection between the type of a typed buffer 127 and the type-dependent processing it receives when the buffer is allocated, reallocated, deallocated, sent, or received is established by a table which is termed a type switch. Type switch (TSW) 503 is a table which has a type switch entry (TSWE) 505 for each kind of typed buffer 127 which is processed by routines executing in process 501. In a preferred embodiment, each TSWE 505 contains a character string which is the name of the type (TN) 507 and a set of entry points to type service routines (TSEPS) 509. Each entry point specifies a type service routine 513 which performs one of the operations in the type-dependent processing of the buffer. In a preferred embodiment, there may be entry points to routines which do the following for typed buffers 127 of the type corresponding to type switch entry 505:

buffer initialization
buffer reinitialization
buffer uninitialization
buffer processing prior to sending
buffer processing in the sender after sending
buffer processing in the receiver after receiving
encoding prior to sending and decoding after receiving
routing to the proper service in a group of services on
  sending. The routing is based on the contents of typed
  buffer 127.

As will be explained in more detail below, the routines in allocate/deallocate 111 and send/receive 113 use system-defined generic routine names to specify the type-dependent operations performed by type services 139. Each generic routine name specifies one of the type dependent operations. For example, the generic routine name "_tminitbuf" specifies the buffer initialization operation. There is an entry point in TSEPS 509 for each of the generic routines to type services routine 513 which performs the operation specified by the generic routine name for the type to which type switch entry 505 corresponds. When one of the routines in allocate/-deallocate 111 or send/receive 113 uses a generic routine name, type services 139 uses type specifier 129 for the typed buffer to locate type switch entry 505 for typed buffer 127's type and then uses TSEPS 509 to invoke type service routine 513 for that type corresponding to the generic routine name. Of course, arguments are specified for each generic routine name, and the routines in allocate/deallocate or send/receive must use actual arguments of the types specified for the generic routine name and the type service routines corresponding to a generic routine name must use formal arguments having the specified types.

The encoding and decoding operations use a second switch, transfer syntax switch (XSSW) 515. As will be explained in more detail later, typed buffers 127 which require encoding or decoding further include a transfer syntax specifier which specifies a transfer syntax into which the typed buffer 127 is to be encoded when it is sent or from which it is to be decoded when received. Each transfer syntax which process 501 can encode or decode has a transfer syntax switch entry (XSSWE) 535 in switch 515. The transfer syntax switch entry 535 has two parts: a character-string name 531 for the transfer syntax and a set of entry points 533 to routines (not shown) which do the encoding and decoding for that transfer syntax. The encode/decode routine for each type uses a generic routine name to invoke the encode routine or the decode routine, and type services 139 uses the generic routine name and the transfer syntax specifier to invoke the proper encode or decode routine as described above for the type switch table.

As indicated above, bulletin board 305 is used in a component system 302 to indicate to processes 501 executing programs in the component system 302 what functions other processes 501 operating as servers 209 make available to client processes 201. Bulletin board 305 has other functions in component system 302, but only those relating to functions provided by servers are of interest in the present context. In a preferred embodiment, bulletin board 305 is in shared memory (SM) 517 of component system 302, i.e., in a part of component system 302's address space which may be addressed by any process 501 operating on component system 302. Consequently, any process 501 may read bulletin board 305.

Each function which a server 209 makes available to any process in distributed system 301 has a bulletin board function entry (BBFE) 519 in bulletin board 305 on every component system 302. Bulletin board function entry 519 contains the following information:
FNAME 521, a character string which is the name of the function;
SERVADDR 523, which specifies service 313 which provides the function by specifying the component system 302 upon which the server(s) 209 providing the function run and the message queue 307 from which it takes requests;
TYPE LIST 525, a list of the kinds of typed buffers 127 which the function can handle; and
XFER S LIST 527, a list of the transfer syntaxes from which the function can decode and into which it can encode.

In a preferred embodiment, the bulletin board function entries 519 are implemented as elements of a hash table. By hashing the name of a function, rapid access is gained to bulletin board function entry 519 for the function.

OPERATION OF APPARATUS 101 IN CS 302

Operation of the embodiment of apparatus 101 shown in FIG. 5 is generally as described with reference to FIG. 1 above. Type-dependent operations invoked by routines in allocate/deallocate routines 111 or send/receive routines 113 are represented by generic routine names for the operations; when the code representing the routine name is executed, type services 139 uses type specifier 129 for the typed buffer 127 being operated on to locate type switch entry 505 corresponding to the specified type and then invokes type service routine 513 in that entry which corresponds to the generic routine name. The routine thereupon performs the function specified by the generic routine name on typed buffer 127 as required by its type. In the case of encode/decode, the encode or decode TSR 513 further uses the transfer syntax specifier in typed buffer 127 and transfer syntax switch entry 535 to invoke the proper encode or decode routine.

Bulletin board function entry 519 is read by the send routines in send/receive 113. In a preferred embodiment, application program 105 specifies that a server process 209 perform a global function on a typed buffer 127 by invoking one of the send routines with at least a pointer to typed buffer 127 and the name of the global function. The send routine uses the function name to locate the bulletin board function entry 519 for the function and makes a copy of the information in the entry. The send routine then determines from buffer type specifier 129 and type list 525 whether the specified function can accept a typed buffer 127 with the type indicated by specifier 129. If it cannot, the send routine returns an error code and does not send typed buffer 127.

If typed buffer 127 has the proper type, the send routine uses transfer syntax list 527 to determine whether conversion to a transfer syntax is necessary and if so, which transfer syntaxes are available for the function. It compares these transfer syntaxes with a list of the locally available transfer syntaxes. If there is no match, the send routine returns an error code and again does not send typed buffer 127. If there is a match, the send routine places a specifier for the transfer syntax in a global variable available to the encode/decode routines and does the pre-send processing as previously described. The encode/decode routines for the type use the specifier for the transfer syntax in transfer syntax switch 515 to locate the routine for the encoding as previously described. Once all the processing is done, the send routine sends typed buffer 127 via IPC 207 to the service specified in service address field 523 of the function's bulletin board function entry 519.

DETAILED DESCRIPTION OF TYPED BUFFER 127 IN A PREFERRED EMBODIMENT: FIG. 4

Figure 4:
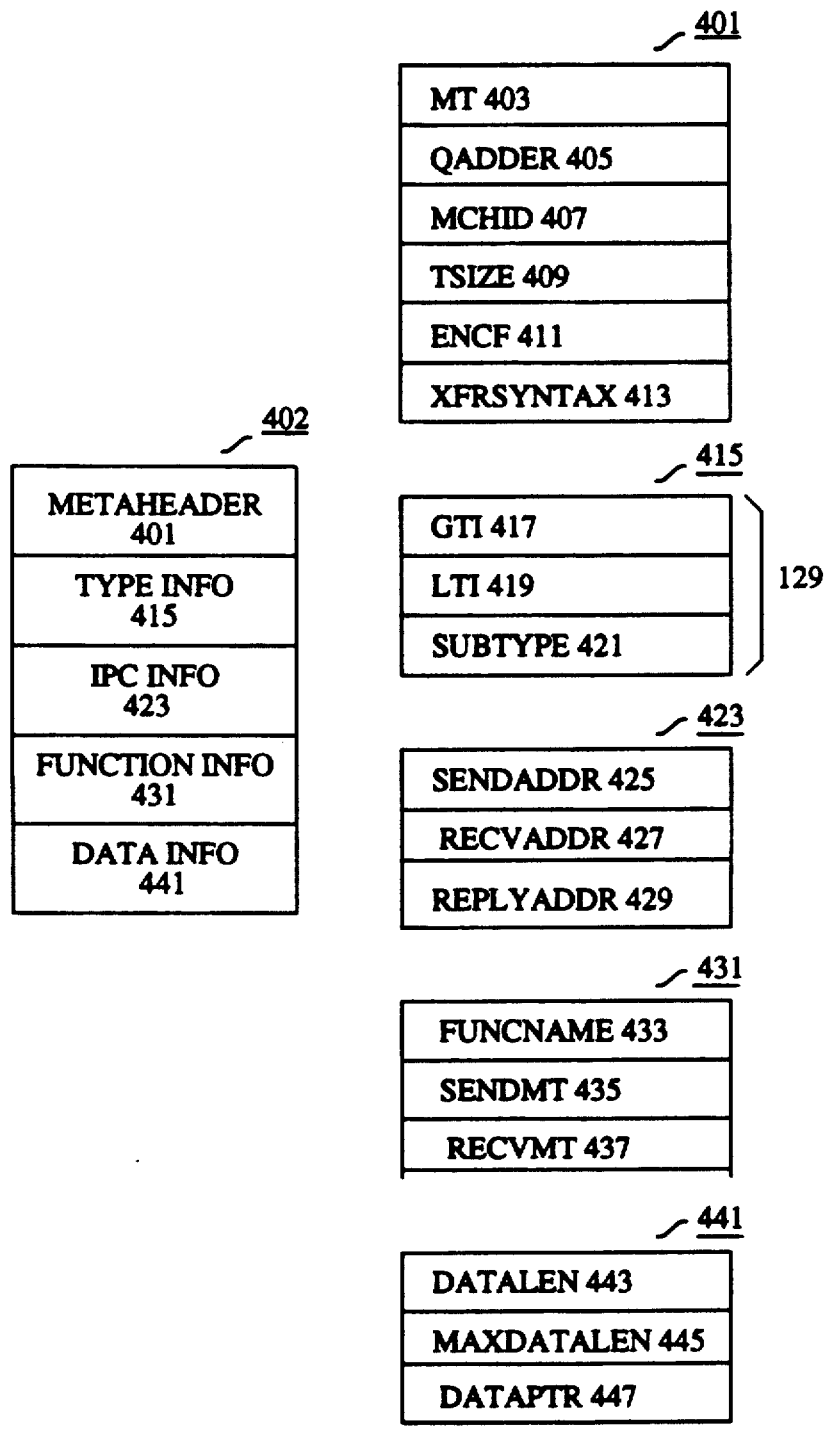
FIG. 4 is a diagram of a header of a typed buffer employed in an embodiment of the invention.

In a preferred embodiment, typed buffer 127 is implemented as a header and a data buffer containing data 131. The data buffer is contiguous to the header. FIG. 4 shows header 402 of typed buffer 127. Header 402 is allocated when typed buffer 127 is created; as will be clear in the following, the information in the fields of header 402 is filled in at various points in the allocation, processing, and sending or receiving of the buffer 127. There are five classes of information in header 402:

Metaheader 401: This portion of header 402 contains information required by the component of distributed system 301 which handles interprocess communications from a process 501 on one component system 302 to a process 501 on another component system 302.

Type information 415: This portion contains the information required to determine the type of typed buffer 127.

Interprocess communication information 423: This portion contains the information required to send typed buffer 127 via IPC 207.

Function information 431: This portion identifies the function which server 209 is to perform on typed buffer 127 and contains information for server 209.

Data information 441: This contains the size and location of data 131 belonging to typed buffer 127.

Continuing with the contents of these portions in detail, communications information 401 includes message type 403, which is a copy of send message type 435 in Function information 431. The message type 403 is a value used by IPC 207 to determine the message's priority when it is read in one of the modes of reading a message queue 307 available to the "get reply" routine. Queue address 405 and machine identifier 407 together specify the location of message queue 307 which is to receive the message. Machine identifier 407 is a logical identifier for component system 302 upon which message queue 307 is located and queue address 405 is the address of message queue 307 in that component system 302. These values are copied from the receiver address portion 427 of IPC info 423. Total size 409 is the total size of the message, i.e., the size of header 402 plus the size of the buffer holding data 131; encode flag 411 indicates whether the message has been encoded; xfer syntax field 413, finally, identifies the transfer syntax used in the encoding operation. As will be explained in more detail later, identification is by means of an index into a table of transfer syntax names which is part of bulletin board 305.

Type information 415 implements buffer type specifier 129 in a preferred embodiment. The type is specified by means of two indexes: global type index 417 is the index of the type in a list of types in the global portion of bulletin board 305; local type index 419 is the index of the entry for the type in type switch 503. Subtype 421 contains a character string which is the name of a subtype of the type specified in fields 417 and 419. When a type is defined with a subtype, type-dependent operations on typed buffers 127 of the type may be further varied according to the subtype. The manner in which the subtype is implemented in type switch 503 will be explained in detail below.

There are three items of information in IPC information 423: sender address 425, which is the information IPC 207 requires to identify process 501 which is sending typed buffer 127; receiver address 427, which is the information required to identify process 501 which is receiving typed buffer 127; and reply address 429, which indicates a process 501 which is to receive any reply 205. Each of these items includes a logical identifier for the component system and the process ID for the process; the receiver address further contains identifiers for service 313 to which server 209 belongs, for server 209, and for message queue 307 employed by server 209. The sender address and the reply address contain identifiers for message queue 307 employed by the process 501 which is sending the message and the process 501 which will receive the reply respectively.

Function information 431 includes the character-string name 433 of the function which is to be performed on typed buffer 127 and in fields 435 and 437, the types of the IPC message which is to be sent to the function 435 and of the IPC message which is to contain the reply from the function 437. Data information 441, finally, contains two length values and a pointer. Data length 433 indicates the length of data 131 currently contained in the data buffer; maximum data length 445 indicates the maximum size of the data buffer. Data pointer 447 points to data 131. In a preferred embodiment, IPC 207 requires that data 131 be contiguous with header 402; in other embodiments, data 131 may be located elsewhere.

The values of the above information are set as follows: when allocate/deallocate 111 allocates a typed buffer 127, it sets maximum data length 445, data pointer 447, local type index 419, and subtype 421. Application program 105 provides arguments including character strings specifying the type and subtype of typed buffer 127 and the maximum length of data 131 to the allocate routine; the allocate routine returns data pointer 447. As will be described below, the allocate routine uses type switch 503 to convert the type and subtype to local type index 419. If typed buffer 127 is reallocated, the reallocation routine resets maximum data length 445 and data pointer 447 as required for the reallocation.

The remaining information in header 402 is set when send/receive 113 sends or receives a typed buffer 127. Beginning with sending, the send routine takes the character-string name of a function and the location and current length of the data in typed buffer 127 as arguments. The send routine checks bulletin board 305 to determine whether there is a function entry 519 for the name; if there is, it determines from bulletin board function entry 519 for the name what types the function can handle, whether an encode operation will be required, and what transfer syntaxes are available for the encode operation. In a preferred embodiment, encoding is required if the component systems 302 have different machine types. Each component system 302 has a character-string machine type name associated with it in bulletin board 305. The machine type name is located using the logical identifier for component system 302. If the character string type names are not identical, encoding is required. The send routine determines from type switch 503 and transfer syntax switch 515 whether buffer 127's type and transfer syntaxes agree with those specified for the function; if they do not, the send routine goes no further.

If they do, the send routine fills in the information in header 402 as follows: it sets global type index 417 from bulletin board function entry 519 and local type index 419 and subtype 421 from type switch 503; further, it fills in sender address 425 and reply address 429 from its own information concerning the environment of process 501; it fills in receiver address 427 from the information retrieved from bulletin board function entry 519 and copies part of that information to fields queue address 405 and machine ID 407 of metaheader 401. Additionally, it fills in request function field 433 with the function name provided to the routine as an argument and sets up send message type 435 and receive message type 437 as required for the transaction; the value of send message type 435 is copied to message type 403.

The send routine then employs the encode/decode routine for the type in type switch 503 to do the encoding using transfer syntax switch 515 as previously described and sets encoded flag 411 to indicate that the contents are encoded and transfer syntax field 413 to the value of the index of the entry for the transfer syntax employed in the encoding in bulletin board 305. The last step is to set TSIZE 409 to indicate the total size of the message, including header 402 and the buffer containing data 131.

After the message has been received in server process 209's message queue 307, send/receive 113 in server process 209 begins by performing any necessary decoding. Encoded flag 411 of course indicates whether decoding is necessary; if it is, send/receive uses the value in transfer syntax 413 to determine the proper index in transder syntax switch 515, and enc/dec uses that value to select the proper decoding routines as already described. Send/receive 113 also replaces the value in local type index field 419 with the index of the type in local type index field 419. The field is set by using global type index 417 as the index into the entry in the bulletin board for the type name. The use of separate global and local type and transfer syntax indexes, together with the translations just described, permits faster type and transfer syntax handling than would be possible with the use of character-string names and further allows reordering of local type and transfer syntax switches without affecting the order of the global type lists in bulletin board 305 and vice-versa.

IMPLEMENTATION OF TYPE SWITCH 503 IN A PREFERRED EMBODIMENT: FIGS. 6 AND 8

Figure 6:
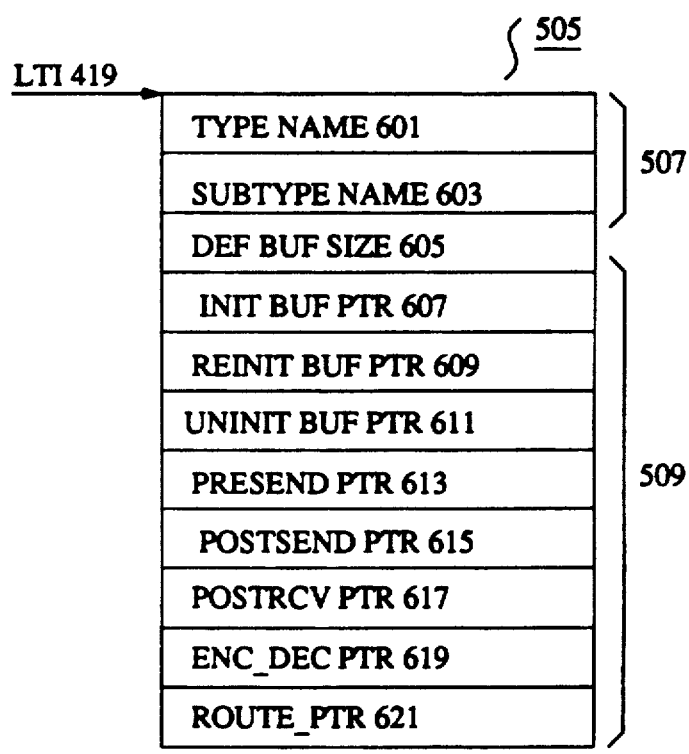
FIG. 6 is a diagram of an entry in the type switch in a preferred embodiment.

As shown in FIG. 5, type switch 503 is an array of type switch entries 505. Local type index 419 in header 402 is the index for type switch entry 505 for the type of typed buffer 127 to which header 402 belongs. Type switch entry 505 for local type index 419 is shown in FIG. 6. The first fields are type name 601 and subtype name 603; together, these constitute a preferred embodiment of TN field 507 of FIG. 5. Type name 601 and subtype name 603 are both character strings identifying the type and subtype respectively; each unique type/subtype pair has its own type switch entry 505 in type switch 503. In a preferred embodiment, subtype name 603 may be set to a value which indicates that the type switch entry 505 applies to any subtype of the type specified by type name 601. The next field, default buffer size 605, specifies the default size of the data in typed buffers 127 of the type specified by fields 601 and 603; the size specified by this field may be overridden by the length argument of the allocate and reallocate routines of allocate/deallocate 111.

The remaining eight fields constitute a preferred embodiment of type service routine entry points 509. The fields contain pointers to the type service routines 513 for the type and subtype specified in fields 601 and 603. In a preferred embodiment, each field corresponds to one of the generic routine names used in allocate/deallocate 111 and send/receive 113 to invoke type-related operations. The relationship between generic name and field is the following:

| generic name | field name |
|---|---|
| __tminitbuf | initbufptr 607 |
| __tmreinitbuf | reinitbufptr 609 |
| __tmuninitbuf | uninitbufptr 611 |

-continued

| generic name | field name |
|---|---|
| __tmpresend | presendptr 613 |
| __tmpostsend | postsendptr 615 |
| __tmpostrecv | postrcvptr 617 |
| __tmencdec | enc__decptr 619 |
| __tmroute | route__ptr 621 |

Figure 8:
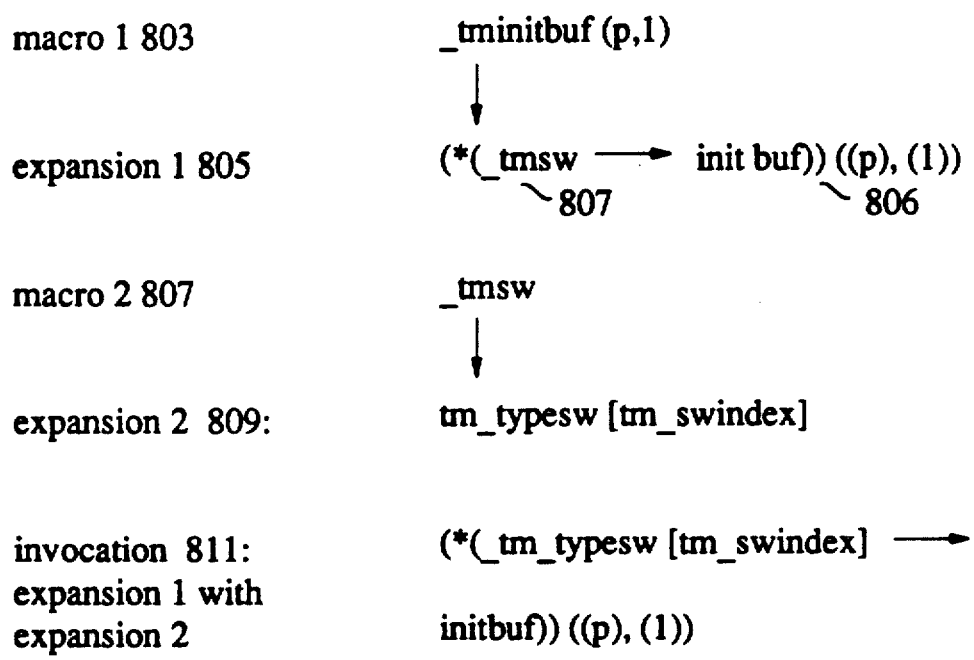
FIG. 8 shows the manner in which a macro name which is a generic operation name is expanded to form an invocation of a type switch routine in a preferred embodiment.

In a preferred embodiment, the generic routine name is in fact the name of a C language macro. Before the source code for allocate/deallocate 111 or send/receive 113 is compiled, a C language macro preprocessor replaces the generic routine name with a reference to the field corresponding to the generic routine name in a type switch entry 505. The index of the type switch entry is a variable which at runtime contains local type index 419 from typed buffer 127 being processed. The C language macro employed for the generic routine name "__tminitbuf" and the macro expansions by means of which that generic routine name becomes a reference to the corresponding field in the type switch entry 505 for the type are shown in FIG. 8. The first macro in macros and expansions 801 is macro 1 803, which is the generic routine name "__tminitbuf(p,1)" as it appears in the source code for the allocate routine in allocate/deallocate 111. The actual arguments "p" and "1" are the pointer to the allocated buffer and the length of the allocated buffer respectively.

"__tminitbuf(p,1)" is defined in the source code as having the expansion 1805, i.e., wherever "__tinitbuf(p,1) appears in the source code, the macro preprocessor replaces it with expansion 1805. Expansion 1805 is a C-language invocation of the routine specified by the procedure pointer in the field "initbuf" of the structure represented by the name "__tmsw" 807. "__tmsw" 807 is, however, another C macro, whose expansion is shown in FIG. 8 as expansion 2 809. Expansion 2 809 is a reference to an element of the array "tm__typesw", which is the name used in the source code for the preferred embodiment for type switch 503. The element is selected by the value of the variable "tm__swindex", which at run time contains the local type index 419 for the typed buffer 127 currently being operated on. When expansion 2 809 is performed in expansion 1 805, the result is invocation 811, which invokes the routine pointed to by the contents of the field "initbuf" in type switch entry 505 specified by the value of "tm__swindex", i.e., an invocation which invokes the routine pointed to by initbufptr 607 in type switch entry 505 corresponding to the type of typed buffer 127.

An advantage of the preferred embodiment of type switch 503 is that allocate/deallocate routines 111 and send/receive routines 113 are insulated from changes in type switch 503 or type service routines 513. When such changes are made, all that is required is that the changed routines 513 or the changed type switch 503 be recompiled and the object code resulting from the compilation be relinked with allocate/deallocate 111 and send/receive 113. In other embodiments, other techniques might be used to associate a generic operation on a typed buffer 127 with the type-specific operation. For example, the generic routine name can be the name of a routine which receives the pointer and length arguments from a routine at buffer services level 109, obtains type specifier 129 from the typed buffer 127 indicated by the pointer, and uses type specifier 129 in invocation 811.

In the TUXEDO® system, four system-defined types for buffers 127 are provided to application programs; in addition, an application program may define its own types for typed buffers 127. To do so, it must provide type service routines 513 for the new type which correspond to the generic routine names and a new type switch 503 to which a type switch entry 505 has been added with the type and subtype names for the new type and pointers to the type service routines 513 for the new type and subtype. The type service routines may either be default routines which are part of the TUXEDO® system or new type service routines 513 written by the user.

Any type service routine 513 written for a new type must conform to the interface and semantics specified for the generic routine name to which the type service routine 513 corresponds. In a preferred embodiment, the generic routine names, their interfaces, and semantics are the following. The interfaces employ the conventions of the C programming language:

ROUTINE SPECIFICS

_tminitbuf()

_tminitbuf() is called from within the allocation routine, tpalloc(), of allocate/deallocate 111, after a buffer has been allocated. _tminitbuf() is passed a pointer to the new buffer, ptr, along with its size so that the buffer may be initialized appropriately. len is the larger of the length passed into tpalloc() and the default specified in dfltsize in that type's switch entry. Note that ptr will never be NULL due to the semantics of tpalloc() and tprealloc(). Upon successful return, that data pointer is returned to the caller of tpalloc().

If a single switch entry is used to manipulate many sub-types, then the writer of _tminitbuf() can use the type determination routine, tptypes() from allocate/deallocate 111 to determine the sub-type.

If no buffer initialization needs to be performed, then the TUXEDO® system's _dfltinitbuf() should be used.

---

NAME

Typed buffer 127 - semantics of linking elements 509 in type switch entry 505

SYNOPSIS

```
int
_tminitbuf(ptr, len)          /* Initialize a new data buffer */
char *ptr;
long len;
int
_tmreinitbuf(ptr, len)        /* Re-initialize a re-allocated data buffer */
char *ptr;
long len;
int
_tmuninitbuf(ptr, len)        /* Un-initialize a data buffer to be freed */
char *ptr;
long len;
long
_tmpresend(ptr, dlen, mdlen)  /* Process buffer before sending */
char *ptr;
long dlen; mdlen;
void
_tmpostsend(ptr, dlen, mdlen) /* Process buffer after sending */
char *ptr;
long dlen; mdlen;
long
_tmpostrecv(ptr, dlen, mdlen) /* Process buffer after receiving */
char *ptr;
long dlen; mdlen;
long                          /* Encode/decode a buffer to/from a transmission format */
_tmencdec(op, encobj, elen, obj, olen)
int op;
char *encobj, *obj;
long elen, olen;
int                           /* Determine server group for routing based on data */
_tmroute(routing_name, function, data, len, group)
char *routing_name, *function, *data;
long len;
char *group;
```

---

DESCRIPTION

The names of the routines specified below are generic routine names used within the TUXEDO® system. Any application adding new routines to the buffer type switch must use names which correspond to real routines, either provided by the application or library routines. The TUXEDO® system provides a default routine for each entry in the buffer type switch which takes the correct number and type of arguments, and returns the correct type and default value. Applications may use these routines when default processing is sufficient. Their definitions are at the end of this section.

Upon success, _tminitbuf() returns 1. If the routine fails, it returns −1 causing tpalloc() to set the TUXEDO® system error variable tperrno() to the error code represented by TPESYSTEM.

_tmreinitbuf()

_tmreinitbuf() behaves almost identically to _tminitbuf() except it is used for re-initializing a re-allocated buffer. The routine is called from within tprealloc(), the re-allocation routine, after the buffer has been re-allocated.

If no buffer re-initialization needs to be performed, then the TUXEDO ® system's _dfltinibuf() should be used.

Upon success, _tmreinitbuf() returns 1. If the routine fails, it returns −1 causing tprealloc() to also return failure setting tperrno to TPESYSTEM.

_tmuninitbuf()

_tmuninitbuf() is called by tpfree(), the typed buffer deallocation routine, before the data buffer is freed. _tmuninitbuf() is passed a pointer to the application portion of a data buffer, along with its size, and may be used to clean up any structures or state information associated with that buffer. ptr will never be NULL due to tpfree()'s semantics. Note that _tmuninitbuf() should not free the buffer itself.

If no processing needs to be performed before freeing a buffer, then the TUXEDO ® system's _dfltinitbuf() should be used.

Upon success, _tmuninitbuf() returns 1. If the routine fails, it returns −1 causing tpfree() to print a userlog() message.

_tmpresend()

_tmpresend() is called before a buffer is sent in tpcall(), tpacall(), tpreturn() or tpforward() These routines are the routines in send/receive 113 which send typed buffers 127 to other processes 501. _tmpresend() is also called after _tmroute() but before _tmencdec(). This routine allows any pre-processing to be performed on a buffer before it is sent. _tmpresend()'s first argument, ptr, is the application data buffer passed into the send call. Its second argument, dlen, is the data's length as passed into the send call. Its third argument, mdlen, is the actual size of the buffer in which the data resides. This routine is called only when ptr is non-NULL.

One important requirement on this routine is that it ensures that when the routine returns, the data pointed to by ptr can be sent "as is." That is, since _tmencdec() is called only if the buffer is being sent to a dissimilar machine, _tmpresend() must ensure upon return that no element in ptr's buffer is a pointer to data that is not contiguous to the buffer.

If no pre-processing needs to be performed on the data and the amount of data the caller specified is the same as the amount that should be sent, then the TUXEDO ® system's _dfltblen() should be used. This routine returns dlen and does nothing to the buffer.

Upon success, _tmpresend() returns the amount of data to be sent. If the routine fails, it returns −1 causing _tmpresend()'s caller to also return failure setting tperrno to TPESYSTEM.

_tmpostsend()

_tmpostsend() is called after a buffer is sent in tpcall() or tpacall(). This routine allows any post-processing to be performed on a buffer after it is sent and before the routine returns. Because the buffer passed into the send call should not be different upon return, _tmpostsend() is called to repair a buffer changed by _tmpresend(). This routine's first argument, ptr, points to the data sent as a result of _tmpresend(). The data's length, as returned from _tmpresend(), is passed in as this routine's second argument, dlen. The third argument, mdlen, is the actual size of the buffer in which the data resides. This routine is called only when ptr is non-NULL.

If no post-processing needs to be performed, then the TUXEDO φ system's _dfltpostsend() should be used.

_tmpostrecv()

_tmpostrecv() is called after a buffer is received, and possibly decoded, in tpgetrply(), the "get reply" routine, tpcall() or in the TUXEDO ® system's server abstraction, and before it is returned to the application. _tmpostrecv() allows any post-processing to be performed on a buffer after it is received and before it is given to the application. Its first argument, ptr, points to the data portion of the buffer received. Its second argument, dlen, specifies the data's size. The third argument, mdlen, specifies the actual size of the buffer in which the data resides. This routine is called only when ptr is non-NULL.

_tmpostrecv() should perform any post-processing on the data and return the data's (possibly new) length. The length returned is passed up to the application in a manner dependent on the call used (e.g., tpcall() sets the data length in one of its arguments for the caller to check upon return).

If no post-processing needs to be performed on the data and the amount of data received is the same as the amount that should be returned to the application, then the TUXEDO ® system's _dfltblen() should be used. This routine returns dlen and does nothing to the buffer.

Upon success, _tmpostrecv() returns the size of the data that the application should be made aware of when the buffer is passed up from the corresponding receive call. If the routine fails, it returns −1 causing _tmpostrecv()'s caller to also return failure setting tperrno to TPESYSTEM.

_tmencdec()

_tmencdec() is used to encode/decode a buffer sent/received over a network to/from a machine having different data representations. The standard XDR transfer syntax is recommended for use in the TUXEDO ® system; however, any encoding/decoding scheme may be used which obeys the semantics of this routine.

This routine is called by tpcall(), tpacall(), tpreturn() and tpforward() to encode the caller's buffer only when it is being sent to an "unlike" machine. In these calls, _tmencdec() is called after both _tmroute() and _tmpresend(), respectively. Recall from the description of _tmpresend() that the buffer passed into _tmencdec() contains no pointers to data which is not contiguous to the buffer.

On the receiving end, tpgetrply(), the receive half of tpcall() and the server abstraction all call _tmencdec() to decode a buffer after they have received it from an "unlike" machine but before calling _tmpostrecv().

_tmencdec()'s first argument, op specifies whether the routine is encoding or decoding data. op may be one of TMENCODE or TMDECODE.

When op is TMENCODE, encobj points to a buffer allocated by the TUXEDO ® system where the encoded version of the data will be copied. The unencoded data resides in obj. That is, when op is TMENCODE, _tmencdec() transforms obj to its encoded format and places the result in encobj. The size of the buffer pointed to by encobj is specified by elen and is at least four times the size of the buffer pointed to by obj whose length is olen. olen is the length returned by _tmpresend(). _tmencdec() returns the size of the encoded data in encobj (i.e., the amount of data to actually send). _tmencdec() should not free either of the buffers passed into the routine.

When op is TMDECODE, encobj points to a buffer allocated by the TUXEDO® system where the encoded version of the data resides as read off a communication endpoint. The length of the buffer is elen. obj points to a buffer which is at least the same size as the buffer pointed to by encobj into which the decoded data is copied. The length of obj is olen. As obj is the buffer ultimately returned to the application, this buffer may be grown by the TUXEDO® system before calling _tmencdec() to ensure that it is large enough to hold the decoded data. _tmencdec() returns the size of the decoded data in obj. After _tmencdec() returns, _tmpostrecv() is called with obj passed as its first argument, _tmencdec()'s return value as its second and olen as its third. _tmencdec() should not free either of the buffers passed into the routine.

_tmencdec() is called only when non-NULL data needs to be encoded or decoded.

If no encoding or decoding needs to be performed on the data even when dissimilar machines exist in the network, then the TUXEDO® system's _dfltencdec() should be used. This routine returns either olen (op equals TMENCODE) or elen (op equals TMDECODE).

Upon success, _tmencdec() returns a non-negative buffer length as described above. If the routine fails, it returns −1 causing _tmencdec()'s caller to also return failure setting tperrno to TPESYSTEM.

_tmroute()

The default for message routing is to route a message to any available server group that offers the desired service. Further, when a given TUXEDO® system is configured, a configuration file, UBBCONFIG is created which has an entry for each function offered by a server 209. Each function entry in the UBBCONFIG file may specify the logical name of some routing criteria for the function using the ROUTING parameter. Multiple functions can share the same routing criteria. In the case that a function has a routing criteria name specified, _tmroute() is used to determine the server group to which a message is sent based on data in the message. This mapping of data to server group is called "data-dependent routing." _tmroute() is called before a buffer is sent (and before _tmpresend() and _tmencdec() are called) in tpcall(), tpacall() and tpforward().

routing_name is the logical name of the routing criteria (as specified in the UBBCONFIG file) and is associated with every function that needs data dependent routing. function is the name of the function for which the request is being made. The parameter data points to the data that is being transmitted in the request and len is its length. Unlike the other routines described in these pages, _tmroute() is called even when ptr is NULL. The group parameter is used to return the name of the group to which the request should be routed. This group name must match one of the group names listed in the UBBCONFIG file (and one which is active at the time the group is chosen). If the request can go to any available server providing the specified function, group should be set to the NULL string and the routine should return 1.

If data dependent routing is not needed for the buffer type, then the TUXEDO® system's _dfltroute() should be used. This routine sets group to the NULL string and returns 1.

Upon success, _tmroute() returns 1. If the routine fails, it returns −1 causing _tmroute()'s caller to also return failure setting tperrno to TPESYSTEM.

If group is set to the name of an invalid server group, the routine calling _tmroute() will return an error and set tperrno to TPESYSTEM.

The implementation of transfer syntax switch entries 535 will not be discussed in detail, since it generally parallels that of type switch entries 505. In the transfer syntax switch entries, the entry contains the character-string name of the transfer syntax, permitting translations between transfer syntax name 413 and the index in transfer syntax switch 515 of transfer syntax switch entry 535 for the transfer syntax. The encode/decode type service routines 513 employ generic names for encoding and decoding operations. Those names are in fact the names of "C" macros, and the same mechanism as was described for type switch 503 is used to relate the generic names to the routines which actually do the encoding and decoding operations for the various transfer syntaxes. As with the type switch, the implementation thus insulates the encode/decode type service routines 513 from the actual details of the encoding and decoding required for the various transfer syntaxes.

DETAILED DESCRIPTION OF BULLETIN BOARD FUNCTION ENTRY 519: FIG. 7

Figure 7:
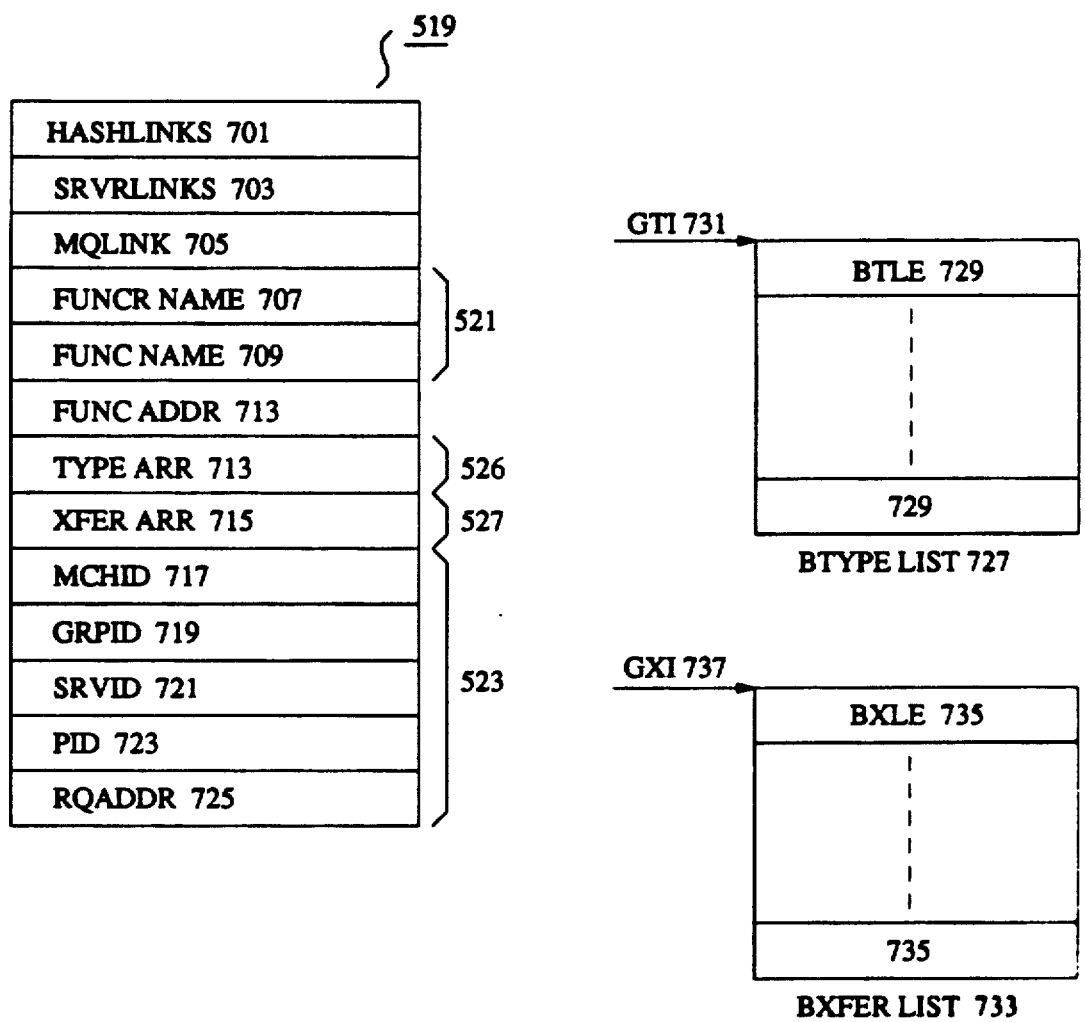
FIG. 7 is a diagram of a bulletin board entry for a function in a preferred embodiment.

FIG. 7 shows the fields of bulletin board function entry 519 in detail; portions of entry 519 which correspond to those shown in FIG. 5 are identified by the corresponding reference numbers from the figure. As previously indicated, bulletin board 305 is a complex data structure which contains information describing global functions, the servers 209 which provide those functions, the component systems 302 upon which the servers execute, and the message queues by means of which clients 201 and servers 209 communicate with each other.

Bulletin board 305 is built from the contents of the UBBCONFIG file and from information provided by the servers 209. The first three components of function entry 519, hash links 701, server links 703, and message queue links 705, are data structures which permit rapid navigation in bulletin board 305 to information about other global functions, the servers, and the message queues. Hash links 701 are links to other function entries 519 in the hash chain to which the given function entry 519 belongs. As previously mentioned, the hash chain permits rapid access of a function entry 519 by function name. Server links 703 are links between function entries 519 for functions executing on a given server and a back link to an entry in the bulletin board which describes the server. The message queue link is a link to an entry in bulletin board 305 which describes message queue 307 which receives requests for the function to which the given function entry 519 belongs.

The next three fields permit location of the function in the server. Function routine name 707 is the name of the routine in the server which performs the function. Function name 709 is the name by which the function is known to clients 201; it is function name 709 which must be used in request function field 433 of typed buffer 127's header. Function address 711 is a pointer to the routine which performs the function.

The next field, type array 713, and bulletin board type list 727, together implement type list 525. In a preferred emnbodiment, each bulletin board 305 has a single bulletin board type list 727 which lists all types of typed buffer 127 which are accepted by one or more of the functions listed on bulletin board 305. List 727 is simply an array of character-string type names; the index in the array of a given type name is global type index 731 for that type; consequently, list 727 permits translation from global type index 731 to type name and vice-versa. Which types a given function accepts are indicated by type array 713, which is a bit string with one bit corresponding to each type listed in bulletin board type list 727. If the bit corresponding to a given type is set, then the function represented by bulletin board function entry 519 accepts that type.

Transfer syntax list 527 is implemented similarly. Bulletin board transfer syntax list 733 is an array of the character-string names of the transfer syntaxes handled by all of the machines in component system 302 belonging to the TUXEDO ® system. The index of the name of a given transfer syntax in list 733 is global transfer list index 737 for that transfer syntax. Transfer syntax array 715 is another bit string which has a bit set for each transfer syntax handled by the machine on which the server 209 for the function runs.

The remaining fields of entry 519 implement server address 523. The field's contents are the following:
machine id 717: a logical identifier for the component system 302 upon which the server runs;
group id 719: a logical identifier for service 313 to which the function's server 209 belongs;
server id 721: A logical identifier for server 209 for the function.
process id 723: the system process identifier for the server's current process; and
request queue address 725: the address of the request queue from which the server 209 takes requests.

As may be seen from the descriptions of these fields and the discussion of inter process communication in the TUXEDO ® system, the information in fields 717-721 is sufficient to permit send/receive 113 to send a typed buffer 127 to any function which has a function entry 519 in bulletin board 305.

As previously mentioned, bulletin board 305 in each component system 302 is maintained by a bulletin board server 303 in that component system. Each bulletin board server 303 has a list of the message queues 307 for all of the other bulletin board servers. By sending each other messages, the bulletin board servers 303 keep bulletin board 305 consistent in each component system 302. Specifically, when a process 501 for a server 209 begins running in a component system 302, process 501 sends bulletin board server 303 in that component system a message with the contents of fields 707-725 for each function which that server 209 makes available to its clients 201, together with a list of the types of typed buffers 127 and a list of the transfer syntaxes handled by the server 209. The sources of the lists of types and transfer syntaxes are of course type switch 503 and transfer syntax switch 515. Using the information provided by server 209's process and bulletin board server 303's own information about component system 302, bulletin board server 303 adds any types or transfer syntaxes not already on the list to bulletin board type list 727 and bulletin board transfer syntax list 733 respectively and constructs bulletin board function entry 519 for each function, setting the type array 713 and transfer syntax array 715 bit arrays as it does so to indicate the types and transfer syntaxes handled by the function. When bulletin board server 303 is finished, it sends copies of the new entry and new bulletin board type list table 727 and new bulletin board transfer syntax list 733 to each of the other bulletin board servers 303. These servers then use the copies to update their bulletin boards 305.

CONCLUSION

The foregoing Detailed Description has disclosed to one of ordinary skill in the art how the apparatus and methods which are the subject of the present application may be made and used and has further disclosed the best mode presently known to the inventors of making and using the invention. The Detailed Description has disclosed an embodiment of the invention in the TUXEDO ® transaction processing system. The TUXEDO ® system is distributed and may include heterogeneous components. The invention may however be embodied in any hierarchically-organized data processing system, regardless of whether it is distributed and regardless of whether it contains heterogeneous components. The TUXEDO ® distributed transaction processing system is further made up of a number of cooperating processes whose interactions are based on the client-server model; again, the invention may be embodied in a system which has only a single process or in which the cooperating processes interact according to another model.

In the embodiment in the Detailed Description, the type-specific operations have been performed as part of system buffer allocation, reallocation, and deallocation operations and as part of system operations which send buffers between component systems of the TUXEDO ® system; in other embodiments, the type-specific operations may be performed as part of other system operations and the type-specific operations themselves may differ from those disclosed herein.

The Detailed Description has further disclosed how the type is associated with the data in the TUXEDO ® system's typed buffer, how the routines which perform type-specific operations are associated with the type in the type switch, and how a function provided by a server employs the bulletin board to indicate what types and transfer syntaxes it accepts. In other embodiments, the functions performed using typed buffer, the type switch, and the bulletin board may be performed using other data structures.

The above being the case, the Detailed Description is to be regarded in all respects as illustrative and exemplary rather than limiting, and the scope of the invention is defined solely by the claims as interpreted in light of the doctrine of equivalents.

What is claimed is:

1. Apparatus in a data processing system for performing an application-defined operation on a first data item as part of a system-defined operation on the first data item comprising:
   first system-defined means for accompanying the first data item with a second data item specifying an application-defined type.
   second system-defined means for establishing a correspondence between an executable definition of the application-defined operation and the type; and
   third system-defined means employed by the system-defined operation and responsive to the second data item for causing the executable definition corresponding to the type specified in the second data item to be executed on the first data item as part of the system-defined operation.

2. The apparatus set forth in claim 1 wherein:

the system-defined operation is sending the data from one component of the data processing system to another component thereof;

both components further include the apparatus of claim 1;

the application-defined operation in the apparatus of the one component processes the first data item prior to sending and/or the application-defined operation in the apparatus of the other component processes the first data item following sending.

3. The apparatus set forth in claim 2 wherein:

the one component is a client process and the other component is a server process which performs at least one function on data;

the computer system further includes bulletin board means accessible to the client process for indicating whether the function performs the function on data having the type specified by the second data item; and the system-defined operation sends the first data item only if the bulletin board means indicates that the function is performed on data having the type specified by the second data item.

4. The apparatus set forth in claim 3 wherein:

the application-defined operation in the apparatus of the one component encodes the first data item into a first transfer syntax;

the application-defined operation in the apparatus of the other component decodes first data item for the function from a second transfer syntax;

the bulletin board means further indicates the second transfer syntax; and the system-defined operation sends the first data item only if the first transfer syntax is the same as the second transfer syntax indicated on the bulletin board.

5. The apparatus set forth in claim 4 wherein:

there are one or more application-defined types;

the first transfer syntax is one of a first set of transfer syntaxes associated with a given one of the application defined types in the apparatus of the client process and the second transfer syntax is one of a second set of transfer syntaxes associated with the given one of the application defined types in the apparatus of the server process;

the bulletin board means further indicates the second set of transfer syntaxes; and the system-defined operation sends the first data item only if at least one transfer syntax in the first set is the same as at least one transfer syntax in the second set.

6. The apparatus set forth in claim 3 wherein:

there is a plurality of application-defined types;

the first system-defined means accompanies the first data item with one of the second data item;

the bulletin board means indicates the types for which the server will perform the function on the first data item; and the system-defined operation sends the first data item only if the type specified by the second data item which accompanies the first data item is one of the types for which the bulletin board means indicates that the server performs the function.

7. The apparatus set forth in claim 2 wherein:

the one component and the other component are heterogeneous; and the application-defined operation in the apparatus of the component and the application-defined operation in the apparatus of the other component operate in succession to put the first data item into the form required by the other component.

8. The apparatus set forth in claim 7 wherein:

the data processing system employs a transfer syntax to transfer data from the one component to the other component;

the application-defined operation in the apparatus of the one component encodes the first data item into the transfer syntax; and the application-defined operation in the apparatus of the other component decodes the first data item from the transfer syntax.

9. The apparatus set forth in claim 1 wherein:

the second system-defined means is an array with an element indexed by the second data item, the element containing at least a specifier for the executable definition of the application-defined operation.

10. The apparatus set forth in claim 9 wherein:

the application-defined operation is one of a plurality thereof and there is an executable definition corresponding to each of the application-defined operations and the element contains a specifier for the executable definition corresponding to each of the application-defined operations.

11. The apparatus set forth in claim 10 wherein:

the system-defined operation is one of a plurality thereof and the element associates each of the specifiers with one of the system-defined operations.

12. The apparatus set forth in claim 9 wherein:

the third system-defined means employs the second data item to access the element and executes the executable definition indicated by the specifier.

13. The apparatus set forth in claim 9 wherein:

the element further contains a name representing the type and the first system-defined means determines the value of the second data item by locating the element containing the name.

14. The apparatus set forth in claim 1 wherein:

the first data item is stored in a buffer;

a header including the second data item accompanies the buffer; and the first system-defined means sets the second data item in the header as required to specify the type.

15. The apparatus set forth in claim 1 wherein:

the system-defined operation belongs to a set of system-defined operations including at least a send operation for sending the first data item to another component of the system, a send-receive operation for sending the first data item and receiving a reply from the other component, or a get reply operation for getting the reply.

16. The apparatus set forth in claim 15 wherein:

the send-receive operation has a send portion and a receive portion; and when the system operation is the send operation or the send portion of the send-receive operation, the application-defined operation is a first set of application-defined operations including a present operation, a routing operation, an encoding operation, and a postsend operation.

17. The apparatus set forth in claim 16 wherein:

when the system operation is the receive portion of the send-receive operation or the get reply operation, the application-defined operation is a second set of application-defined operations including a decode operation and a postreceive operation.

18. The apparatus set forth in claim 15 wherein:
the application-defined operation is a present operation when the system-defined operation is a send operation or a send-receive operation.

19. The apparatus set forth in claim 15 wherein:
the application-defined operation is an encode operation for encoding the first data item in a transfer syntax when the system-defined operation is a send operation or a send-receive operation.

20. The apparatus set forth in claim 15 wherein:
the application-defined operation is a routing operation for routing the first data item to the other component when the system-defined operation is a send operation or a send-receive operation.

21. The apparatus set forth in claim 15 wherein:
the application-defined operation is a postsend operation when the system-defined operation is a send operation or a send-receive operation.

22. The apparatus set forth in claim 15 wherein:
the application-defined operation is a postreceive operation when the system-defined operation is a send-receive operation or a get reply operation.

23. The apparatus set forth in claim 15 wherein:
the application-defined operation is a decode operation for decoding the first data item from a transfer syntax when the system-defined operation is a send-receive operation or a get reply operation.

24. The apparatus set forth in claim 1 wherein:
the application-defined operation is one of a plurality thereof, each of which has a corresponding executable definition and
the second system-defined means establishes the correspondence between the executable definitions corresponding to the plurality of application defined operations and the type.

25. The apparatus set forth in claim 24 wherein:
the system defined operation is one of a plurality thereof and
the second system-defined means further establishes a correspondence between each one of the executable definitions and one of the system-defined operations.

26. The apparatus set forth in claim 1 wherein:
the system-defined operation belongs to a set of system-defined operations including at least an allocate operation for allocating memory for the first data item, a deallocate operation for deallocating the memory, or a reallocate operation for reallocating the memory.

27. The apparatus set forth in claim 26 wherein:
the application-defined operation is an initialization operation for initializing the memory when the system defined operation is an allocate or reallocate operation or an uninitialization operation for uninitializing the memory when the system defined operation is a deallocate operation.

28. A data processing system of the type employing a server process to perform a function on a first data item for a client process, the data processing system being characterized in that:
the client process employs first system-defined means for accompanying the first data item with a second data item specifying an application-defined type, second system-defined means for establishing a correspondence between a first executable definition of a first application-defined operation and the type, and third system-defined means employed by the system-defined operation of sending the first data item to the server for responding to the second data item by causing the first executable definition corresponding to the type to be executed on the first data item as part of the system-defined sending operation; and
the server process employs fourth system-defined means for establishing a correspondence between a second executable definition of a second application-defined operation and the type and fifth system-defined means employed by the system-defined operation of receiving the first data item from the client for responding to the second data item by causing the second executable definition to be executed on the first data item as part of the system-defined receiving operation.

29. A method used in a data processing system for performing an application-defined operation on a first data item as part of a system-defined operation on the first data item comprising the steps of:
employing first system-defined means to establish a correspondence between an executable definition of the application-defined operation and an application-defined type;
employing second system-defined means to accompany the first data item with a second data item specifying the type; and
employing third system-defined means responsive to the second data item to cause the executable definition corresponding to the type to be executed on the first data item as part of the system-defined operation.

* * * * *